(12) United States Patent
Time

(10) Patent No.: US 10,132,377 B2
(45) Date of Patent: Nov. 20, 2018

(54) ATTACHMENT ARRANGEMENT FOR A LEAF SPRING COMPOUND

(71) Applicant: KVERNELAND GROUP OPERATIONS NORWAY AS, Kvernaland (NO)

(72) Inventor: Eyvind Time, Bryne (NO)

(73) Assignee: KVERNELAND GROUP OPERATIONS NORWAY AS, Kvernaland (NO)

( * ) Notice: Subject to any disclaimer, the term of this patent is extended or adjusted under 35 U.S.C. 154(b) by 269 days.

(21) Appl. No.: 15/029,760

(22) PCT Filed: Oct. 8, 2014

(86) PCT No.: PCT/NO2014/050190
§ 371 (c)(1),
(2) Date: Apr. 15, 2016

(87) PCT Pub. No.: WO2015/057079
PCT Pub. Date: Apr. 23, 2015

(65) Prior Publication Data
US 2016/0245355 A1    Aug. 25, 2016

(30) Foreign Application Priority Data

Oct. 18, 2013   (NO) .................................... 20131385

(51) Int. Cl.
*F16F 1/26*   (2006.01)
*A01B 61/04*   (2006.01)
(Continued)

(52) U.S. Cl.
CPC .............. *F16F 1/26* (2013.01); *A01B 61/046* (2013.01); *F16B 41/002* (2013.01); *A01B 3/42* (2013.01); *F16F 2230/0005* (2013.01)

(58) Field of Classification Search
CPC ....... A01B 61/046; A01B 3/42; F16B 41/002; F16F 1/26; F16F 2230/0005; A01L 33/42; B60G 11/04; B60G 11/113
(Continued)

(56) References Cited

U.S. PATENT DOCUMENTS

| 38,661 | A | * | 5/1863 | Douglass | .................. | F16F 1/26 |
| | | | | | | 267/53 |
| 720,914 | A | * | 2/1903 | Harty | ........................ | F16F 1/26 |
| | | | | | | 267/53 |

(Continued)

FOREIGN PATENT DOCUMENTS

DE   25 32 547 A1   4/1976
EP   0 171 861 A1   2/1986
(Continued)

*Primary Examiner* — Amber R Anderson
*Assistant Examiner* — Nahid Amiri
(74) *Attorney, Agent, or Firm* — Foley & Lardner LLP

(57) ABSTRACT

An attachment arrangement for holding together end portions of a plurality of leaf springs of a leaf-spring compound used in a release system for soil-working implements includes a coupling element, a clamping bolt, a stop element, and a supporting element. The coupling element supports the end portions of the plurality of leaf springs. The clamping bolt attaches the end portions of the plurality of leaf springs to the coupling element. The supporting element creates a clearance to an inner leaf spring. The supporting element is positioned at least partially over a cut-out provided in the plurality of leaf springs.

19 Claims, 5 Drawing Sheets

(51) Int. Cl.
*F16B 41/00* (2006.01)
*A01B 3/42* (2006.01)

(58) Field of Classification Search
USPC .......... 403/100–102; 267/260, 262; 271/271, 271/265, 705, 720, 765; 280/124.17, 280/124.174, 124.175
See application file for complete search history.

(56) References Cited

U.S. PATENT DOCUMENTS

| | | | | |
|---|---|---|---|---|
| 945,336 A * | 1/1910 | Lieb | ............. | F16F 1/26 267/53 |
| 999,826 A * | 8/1911 | McGahee | ............. | F16F 1/26 267/53 |
| 1,169,473 A * | 1/1916 | Ferguson | ............. | B60G 11/12 267/260 |
| 1,829,163 A * | 10/1931 | Sprong | ............. | B60G 11/12 267/260 |
| 1,929,796 A * | 10/1933 | Stolte | ............. | B60G 11/12 267/262 |
| 2,539,091 A * | 1/1951 | Linke | ............. | B60G 11/113 267/269 |
| 2,762,622 A * | 9/1956 | Van Raden | ............. | B60G 11/113 267/269 |
| 2,772,891 A * | 12/1956 | Bonnin | ............. | B60G 5/047 267/260 |
| 3,010,744 A * | 11/1961 | Hollis | ............. | A01B 35/225 172/271 |
| 3,074,738 A * | 1/1963 | Ward | ............. | B60G 5/047 280/682 |
| 3,173,668 A * | 3/1965 | Giovinazzo | ............. | B60G 11/107 267/262 |
| 3,243,198 A * | 3/1966 | Simovich | ............. | B60G 21/05 267/239 |
| 3,279,869 A * | 10/1966 | Andersen | ............. | A01B 23/02 172/711 |
| 3,494,608 A * | 2/1970 | McGee | ............. | B60G 11/465 267/31 |
| 3,767,222 A * | 10/1973 | Willetts | ............. | B60G 5/04 267/136 |
| 3,789,928 A * | 2/1974 | Nja | ............. | A01B 61/048 172/709 |
| 3,814,463 A * | 6/1974 | Tunesi | ............. | B60D 1/065 280/406.2 |
| 3,891,197 A * | 6/1975 | Poulos | ............. | B60G 11/04 267/47 |
| 3,910,354 A | 10/1975 | Johnson et al. | | |
| 3,964,600 A | 6/1976 | Vensel | | |
| 3,964,735 A * | 6/1976 | Wright | ............. | B60G 5/047 267/25 |
| 4,313,620 A * | 2/1982 | Posnikoff | ............. | B60G 11/04 267/158 |
| 4,322,061 A * | 3/1982 | Masser | ............. | B60G 5/03 267/269 |
| 4,502,707 A * | 3/1985 | Jable | ............. | B60G 5/047 267/262 |
| 4,691,645 A * | 9/1987 | Anderson | ............. | A01C 5/06 111/147 |
| 4,771,997 A * | 9/1988 | Haldenwanger | ...... | F16F 1/3686 267/260 |
| 5,154,239 A * | 10/1992 | Harrell | ............. | A01B 61/044 172/219 |
| 5,251,886 A * | 10/1993 | Bursel | ............. | B60G 9/003 267/229 |
| 5,335,934 A * | 8/1994 | Hiller | ............. | B60G 11/107 267/260 |
| 7,520,517 B2 * | 4/2009 | Svendsen | ............. | B60G 11/04 267/260 |
| 7,918,478 B2 * | 4/2011 | Fenton | ............. | B60G 11/12 267/260 |
| 8,327,780 B2 * | 12/2012 | Bassett | ............. | A01C 23/025 111/119 |
| 8,365,837 B2 * | 2/2013 | Gray | ............. | A01B 21/086 172/265 |
| 8,820,760 B2 * | 9/2014 | Aalderink | ............. | B60G 9/003 280/124.116 |
| 8,925,958 B2 * | 1/2015 | Araujo | ............. | B60G 11/10 280/124.163 |
| 9,115,778 B2 * | 8/2015 | Wagner | ............. | B60G 11/08 |
| 2007/0085293 A1 * | 4/2007 | Smith | ............. | B60G 7/001 280/124.17 |
| 2008/0036182 A1 * | 2/2008 | Fenton | ............. | B60G 5/00 280/682 |
| 2011/0057409 A1 | 3/2011 | Leeder | | |
| 2013/0127133 A1 * | 5/2013 | Enomoto | ............. | B60G 11/04 280/124.175 |
| 2016/0057882 A1 * | 2/2016 | Wuerstlein | ......... | G01R 27/2605 361/752 |

FOREIGN PATENT DOCUMENTS

| | | |
|---|---|---|
| EP | 0188133 A1 | 7/1986 |
| EP | 0 199 406 A1 | 10/1986 |
| EP | 0 346 319 A1 | 12/1989 |
| FR | 2623964 A1 | 6/1989 |
| GB | 2039201 A | 8/1980 |
| GB | 2 170 383 A | 8/1986 |

* cited by examiner

ATTACHMENT ARRANGEMENT FOR A LEAF SPRING COMPOUND

CROSS-REFERENCE TO RELATED APPLICATIONS

This application is a U.S. national stage entry of PCT/NO2014/050190, filed on Oct. 8, 2014, which claims the benefit of and priority to Norwegian Patent Application No. 20131385 filed on Oct. 18, 2013, the entire disclosure of which is incorporated by reference herein.

BACKGROUND

The invention provides an attachment arrangement for a leaf-spring compound used as a release system especially for soil-working implements, the leaf-spring compound including several leaf springs with substantially identical ground plans.

In a plough with a release mechanism that is activated when a plough body meets an earthfast stone, for example, and the release mechanism is to return to a normal working position as soon as the cause of the release has been passed, a hydraulic or mechanical release system is used as a rule. One version of a mechanical release system includes a leaf-spring package, in which the releasing force can be adjusted by single leaf springs being added or removed. Leaf-spring packages of this kind are held together with bolts in the middle portion of the leaf springs. The drawback of this solution are that the bolt holes constitute a potential starting point for material cracks leading to spring ruptures. Leaf springs of this kind are known from the applicant's products over several decades.

SUMMARY

The invention has for its object to remedy or to reduce at least one of the drawbacks of the prior art or at least to provide a useful alternative to the prior art.

The object is achieved through features, which are specified in the description below and in the claims that follow.

An attachment arrangement for a leaf-spring compound used as a release system especially for soil-working implements is provided, the leaf-spring compound including several leaf springs, also called a spring package, with substantially identical ground plans, but possibly with different spring characteristics, typically provided by using leaf springs of different material thicknesses. The leaf springs are held together by an attachment arrangement at either end of the leaf springs.

Each end portion of the leaf springs may be arranged in a coupling element, wherein all the leaf springs are attached to the coupling element, and the coupling element is further attached to elements constituting adjacent parts of the release system. A coupling element typically includes a bottom plate, an end wall and two opposite side walls and is thereby open in two directions, allowing the leaf springs to be inserted in these directions.

The spring package may be attached to the coupling element with a clamping bolt that projects up from a bolt hole in the bottom plate of the coupling element and through cut-outs in the end portions of the leaf springs, the cut-outs having a substantially larger extent in the longitudinal direction of the spring package than the diameter of the clamping bolt to allow relative, longitudinal motion of the individual leaf springs when they are being tensioned, possibly also having a larger transverse dimension in order to provide room for a sleeve-shaped supporting element which has been guided onto and surrounds a portion of the clamping bolt and exhibits a clearance to the cut-out in the leaf springs. The supporting element of this kind may internally be provided with threads coarser than the threads of the clamping bolt. Alternatively, the supporting element consists of a supporting plate extending between the walls of the coupling element and resting against the end portion of the inner leaf spring.

In one embodiment, the threads of the clamping bolt form an engagement means for a stop element in the form of a nut. The nut, which is provided with an internal thread diameter and pitch like those of the clamping bolt and has an external thread diameter and pitch corresponding to those of the internal threads of the sleeve-shaped supporting element, may be provided with a projecting portion and an outer end portion that forms a coupling portion arranged for engagement with a tightening tool, for example a coupling portion of an external square or hexagon shape for connection to a tightening tool, for example an open-end spanner or a hexagon socket spanner. Alternatively, the projecting portion may form the coupling portion.

Alternatively, and in combination with the plate-shaped supporting element, a smooth clamping bolt is used, provided with engagement means in the form of several transverse holes in the bolt end opposite the bolt head. The holes form alternative positions for a locking bolt. A hole giving a moderate clearance between the leaf springs of the spring package is used. The locking bolt may be secured with a securing means, typically in the form of a spring pin.

The sleeve-shaped supporting element may advantageously include a securing means in the form of an anti-rotation means, for example a peg on a projecting end portion of the supporting element, the peg being arranged to engage with a portion of a leaf spring, for example the elongated slot forming the cut-out in the end portion of the leaf spring.

When a spring package is attached by the use of the sleeve-shaped supporting element, the spring package is laid against the internal bottom surface of the coupling element, and the supporting element is brought into place in the cut-out of the spring package with the securing means in engagement with the cut-out in the spring package. While the supporting element is resting with its end portion against the bottom of the coupling element, possibly with its projecting middle portion against the spring package, the nut is screwed onto the clamping bolt and the supporting element. Because of the different thread pitches of the clamping bolt and the supporting element, the supporting element is pulled away from its abutment against the bottom of the coupling element or the spring package. Thereby, a desired clearance arises between the spring package and the projecting middle portion of the nut, and the spring package is given the possibility to creep during tensioning and relaxing. This is necessary because the different springs will have different diameters of curvature when tensioned and thereby have a need for varying movement in their attachment. The threaded connection of the nut to the supporting element provides for secure locking of the supporting element to the clamping bolt.

When attaching the spring package by the use of the plate-shaped supporting element, the spring package is slipped onto the clamping bolt. The supporting plate is slipped onto the free clamping-bolt end and is locked by the locking bolt being inserted into the one of the holes in the clamping bolt that gives a moderate clearance between the leaf springs, so that they can move relative to each other without any friction worth mentioning. The locking bolt is secured with the securing means, for example a spring pin, through the securing-means hole in the locking bolt.

The invention relates more specifically to an attachment arrangement for a leaf-spring compound used as a release system especially for soil-working implements, the leaf-spring compound including several leaf springs with substantially identical ground plans, characterized by the leaf springs being held together by an attachment arrangement at either end portion of the leaf springs, each of the end portions of each leaf spring abutting supportingly in a coupling element and being attached to the coupling element with a clamping bolt, a stop element and a supporting element, the supporting element creating a clearance to an inner leaf spring and being positioned at least partially over a cut-out in the leaf springs.

The stop element may be a locking bolt arranged to engage with an engagement means arranged in the clamping bolt in the form of one or more locking-bolt holes.

The supporting element may be formed as a supporting plate complementary to the inside of the coupling element.

The stop element may be a nut, and
the width of the cut-out may be larger than the cylindrical diameter of the supporting element, but smaller than the diameter of a projecting, outer end portion of the supporting element, and the supporting element may be provided with an internal threaded portion,
the nut may include a projecting portion, an external threaded portion arranged to engage with the internal threaded portion of the supporting element, an internal threaded portion and a coupling portion arranged for engagement with a tightening tool,
the clamping bolt may be provided with an engagement portion arranged for releasable engagement with the nut in the form of a threaded portion arranged to engage with the internal threaded portion of the nut, and
the external threaded portion of the nut may have a larger thread pitch than the internal threaded portion of the nut.

The coupling portion may consist of the projecting portion of the nut.

The coupling portion may consist of a second end portion of the nut.

The supporting element may be provided with a securing means.

The securing means may be a peg arranged in the projecting end portion of the supporting element and be arranged to engage with a portion of the cut-out having its mouth at the end portions of the leaf springs.

Alternatively the securing means may be a spring pin arranged in a securing-means hole in the locking bolt.

BRIEF DESCRIPTION OF THE DRAWINGS

In what follows, examples of preferred embodiments are described, which is visualized in the accompanying drawings, in which.

DETAILED DESCRIPTION

Figures 1, 2:
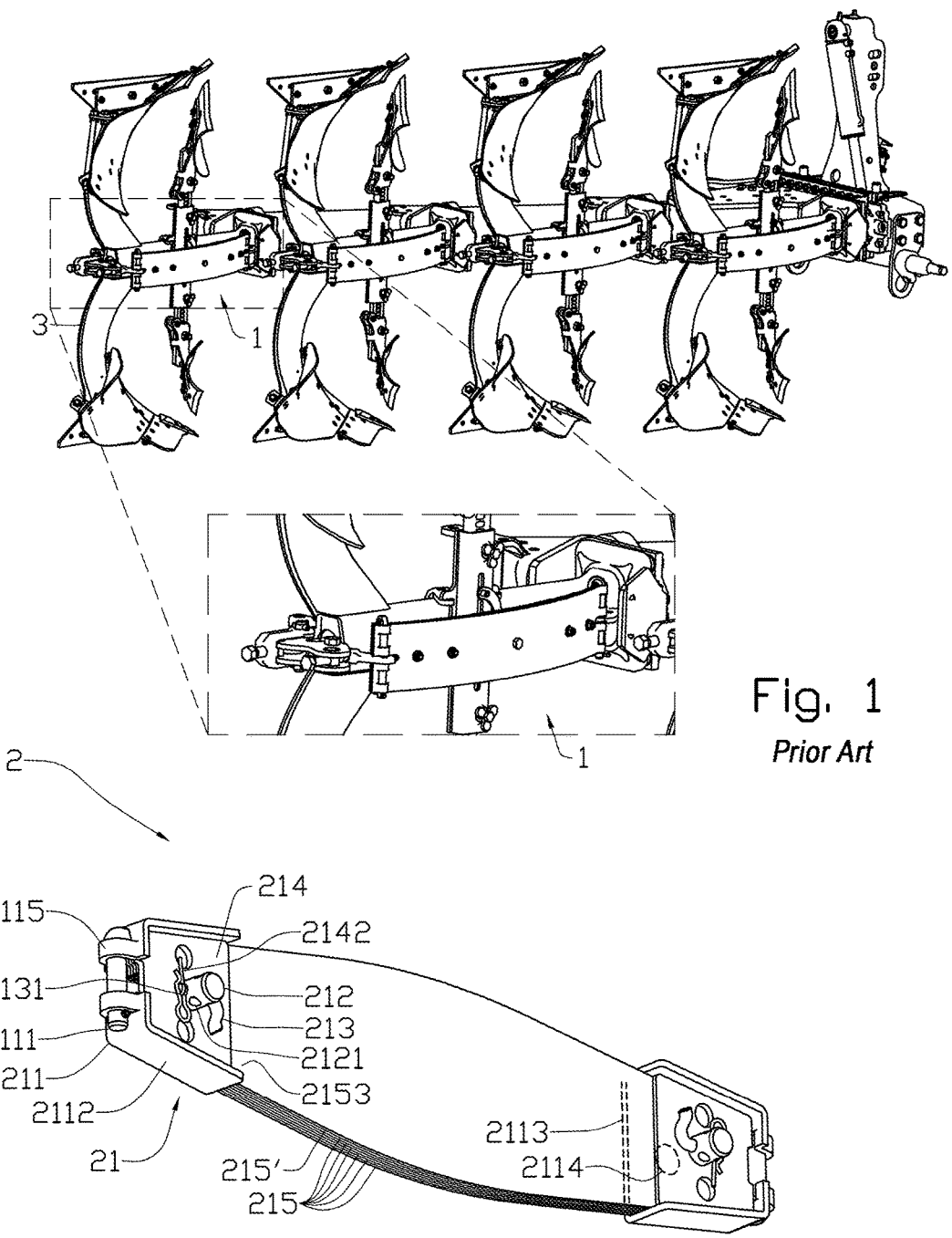
FIG. 1 shows a perspective drawing of prior-art leaf-spring compounds used on a reversible plough.
FIG. 2 shows a perspective drawing of a leaf-spring compound according to a first embodiment of the invention, viewed from below.

Connected to a so-called beam 3 of a plough, shown as a reversible plough in FIG. 1, a release system 1 has been arranged, ensuring that the plough will yield to earthfast obstructions, for example stones. In FIG. 1, the applicant's own prior-art leaf-spring compound is shown, in which the springs are held together at their middle portions.

Figure 3:
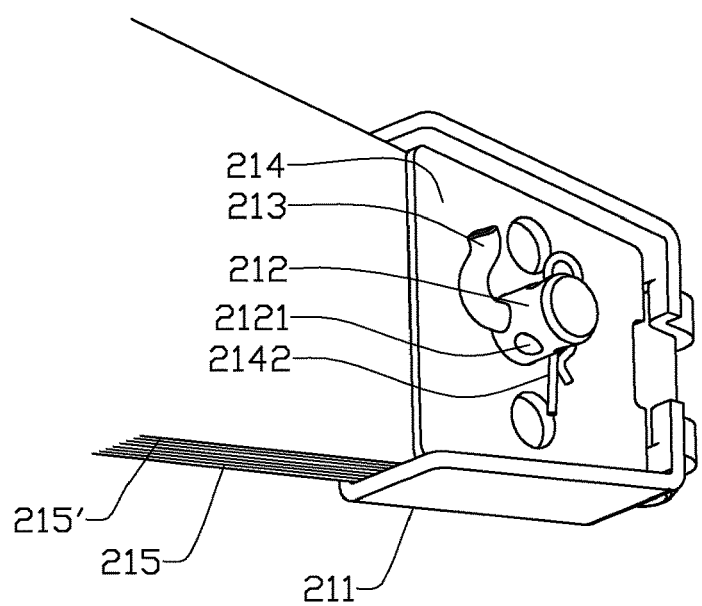
FIG. 3 shows, in perspective, an attachment arrangement forming an end portion of the leaf-spring compound.
Figure 4:
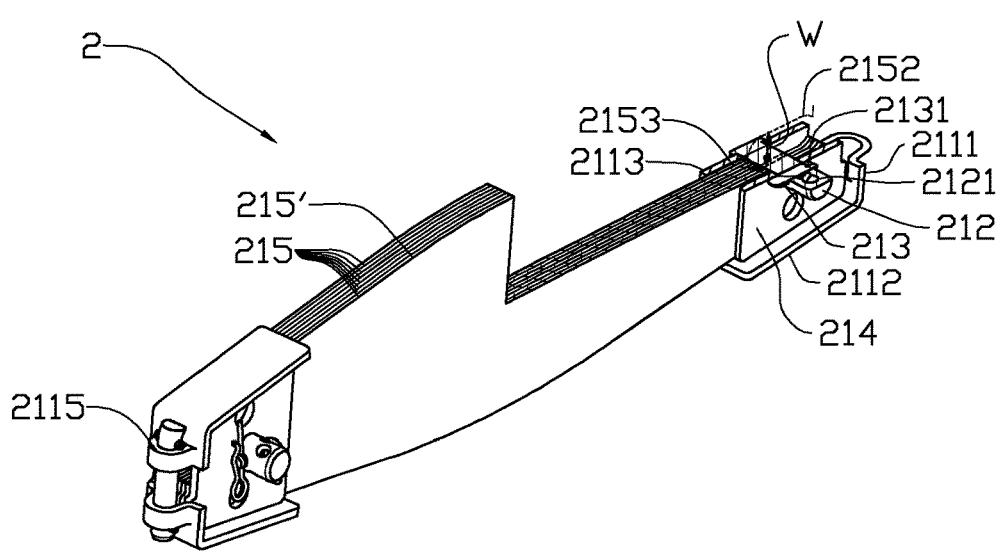
FIG. 4 shows, in perspective, a section through the centre axis of an end portion of the leaf-spring compound.
Figure 5:
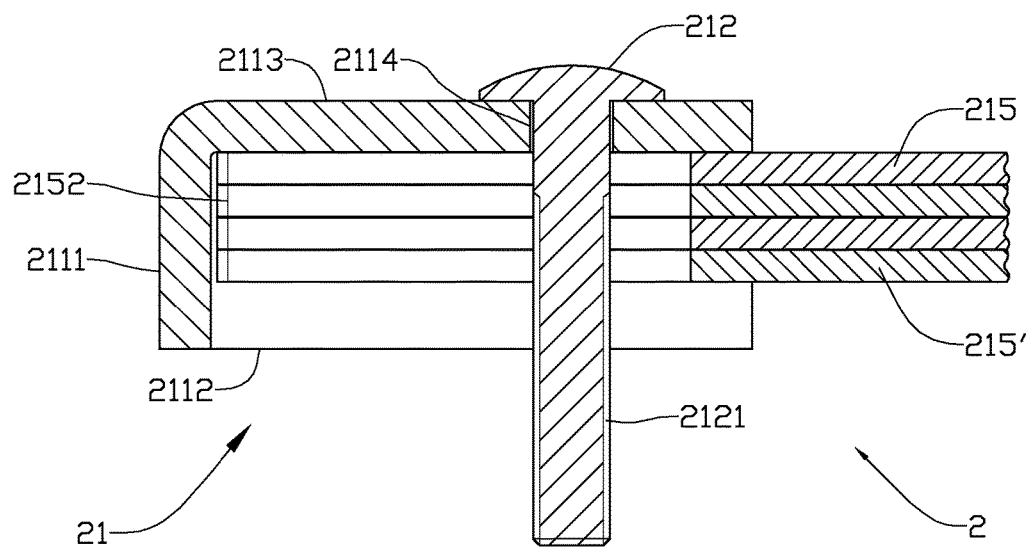
FIG. 5 shows a longitudinal section through an end portion of the leaf-spring compound according to a second embodiment of the invention in a first phase of the attachment of a package of leaf springs.

Reference is now made to FIGS. 2-4, in which a leaf-spring compound 2 according to a first embodiment of the invention includes an attachment arrangement 21 at either end of the leaf-spring compound 2. A coupling element 211 is provided with an end wall 2111 and two opposite side walls 2112. The coupling element 211 is thereby open to receive an end portion 2153 of one or more leaf springs 215, 215'. The coupling element 211 is also provided with a bolt hole 2114 in a bottom portion 2113. In the end wall 2111, the coupling element 211 is provided with an end attachment 2115 for connection to the plough.

A clamping bolt 212 extending through the bolt hole 2114 of the coupling element 211 is provided with engagement means 2121 in the form of several locking-bolt holes.

The leaf-spring compound 2 includes several leaf springs 215, 215', each provided with a cut-out 2152 (see FIG. 4) having a mouth with a narrowed width at either end portion 2153.

A plate-shaped supporting element 214 is substantially congruent with the inside of the coupling element 211 and is arranged to rest supportingly against an inner leaf spring 215' of the leaf-spring compound 2.

A locking bolt 213 forms a stop element and is arranged to engage with one of the locking-bolt holes 2121 in the clamping bolt 212. When fitting the leaf-spring compound 2, the locking-bolt hole 2121 that gives a moderate mutual clearance between the end portions 2153 of the leaf springs 215, 215' is preferably chosen. The locking bolt 213 is secured against falling out by means of a securing means 2142, shown here as a spring pin extending through a securing-means hole 2131 in the locking bolt 213.

Reference is now made to FIGS. 5-9, in which the leaf-spring compound 2 according to a second embodiment of the invention includes an attachment arrangement 21 at either end of the leaf-spring compound 2. The coupling element 211 is as described above.

In this embodiment, the clamping bolt 212 projecting through the bolt hole 2114 of the coupling element 211 is provided with an engagement means 2121 in the form of a threaded portion.

The leaf-spring compound 2 includes several leaf springs 215, 215', each provided with a cut-out 2152 having a mouth with a narrowed width at either end portion 2153. The cut-out 2152 has a transverse dimension W (see FIG. 4).

Figure 6:
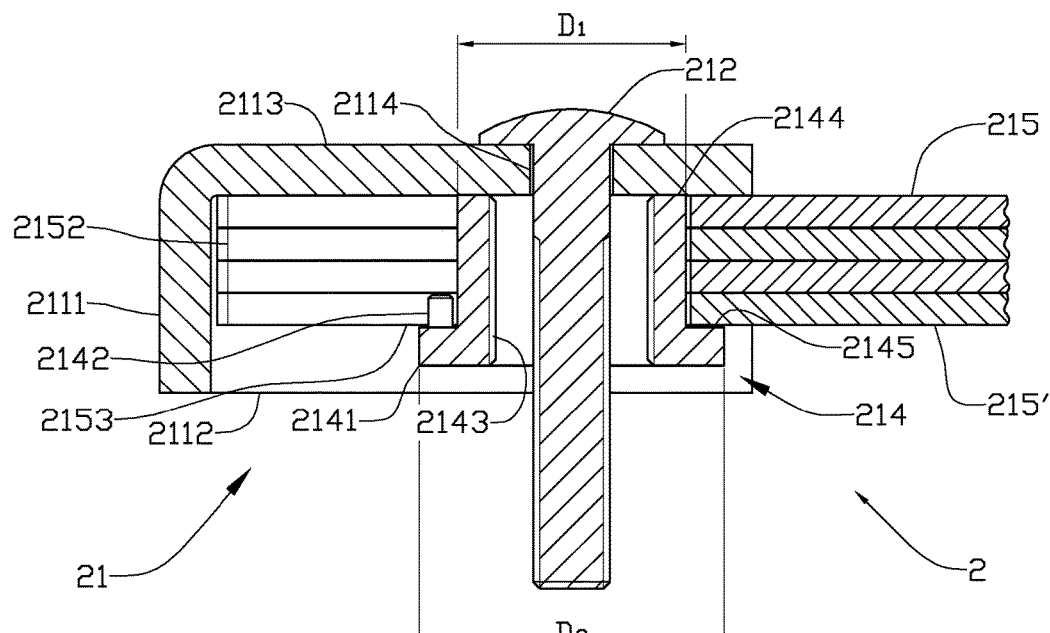
FIG. 6 shows a longitudinal section through an end portion of the leaf-spring compound in a second phase of the attachment of a spring package.
Figure 7:
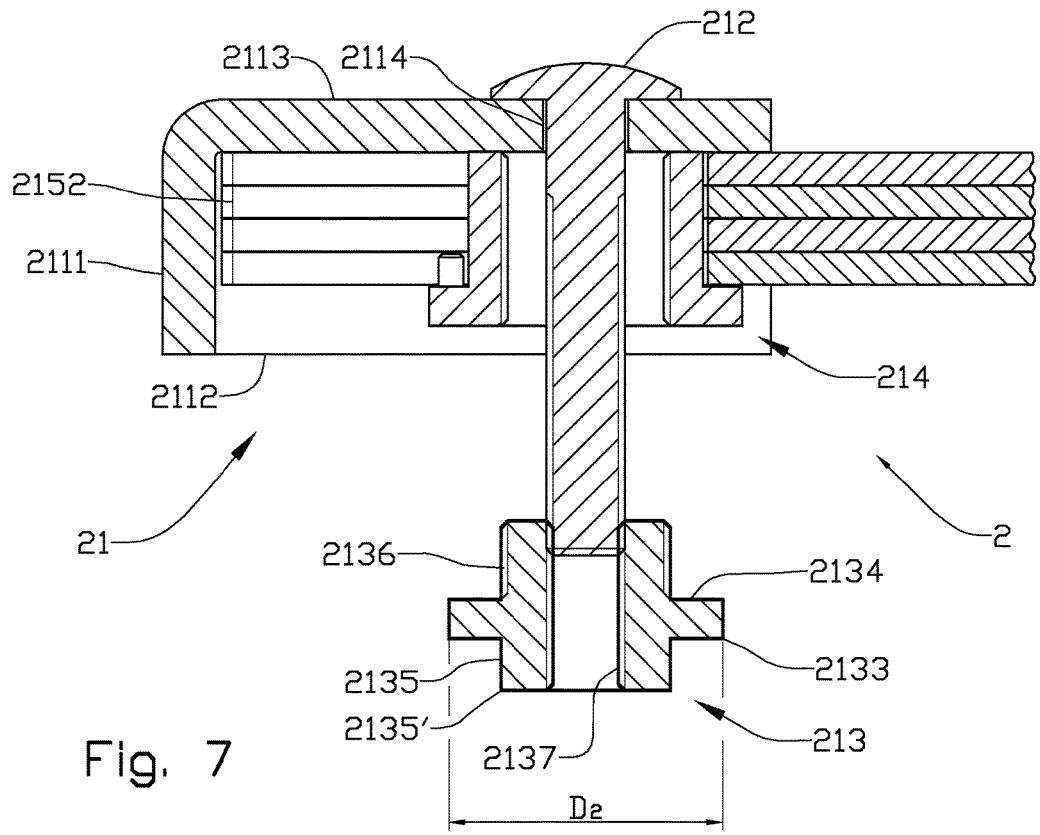
FIG. 7 shows a longitudinal section through an end portion of the leaf-spring compound in a third phase of the attachment of a spring package.
Figure 8:
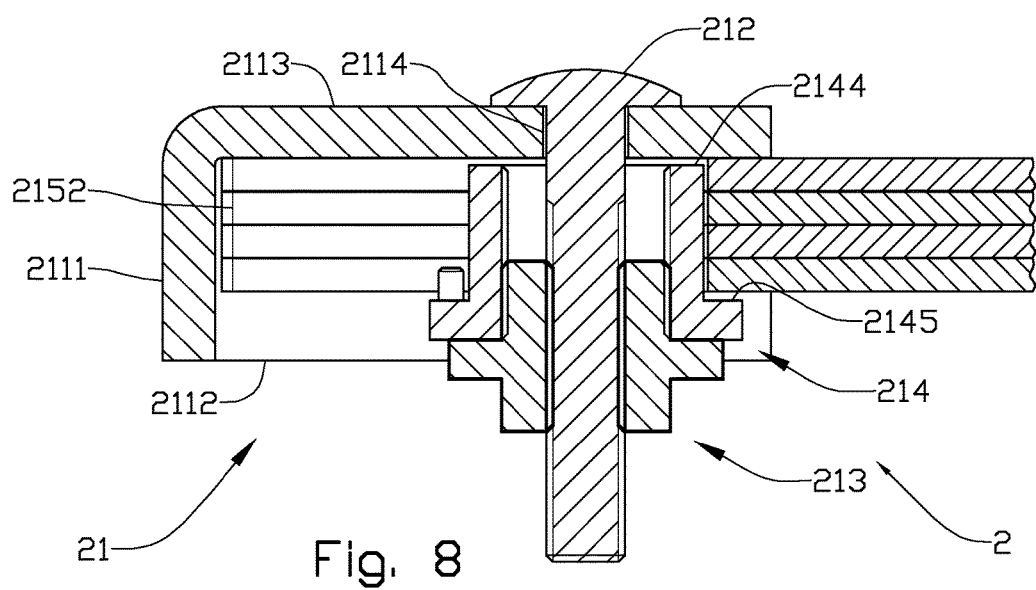
FIG. 8 shows a longitudinal section through an end portion of the leaf-spring compound in a last phase of the attachment of a spring package.
Figure 9:
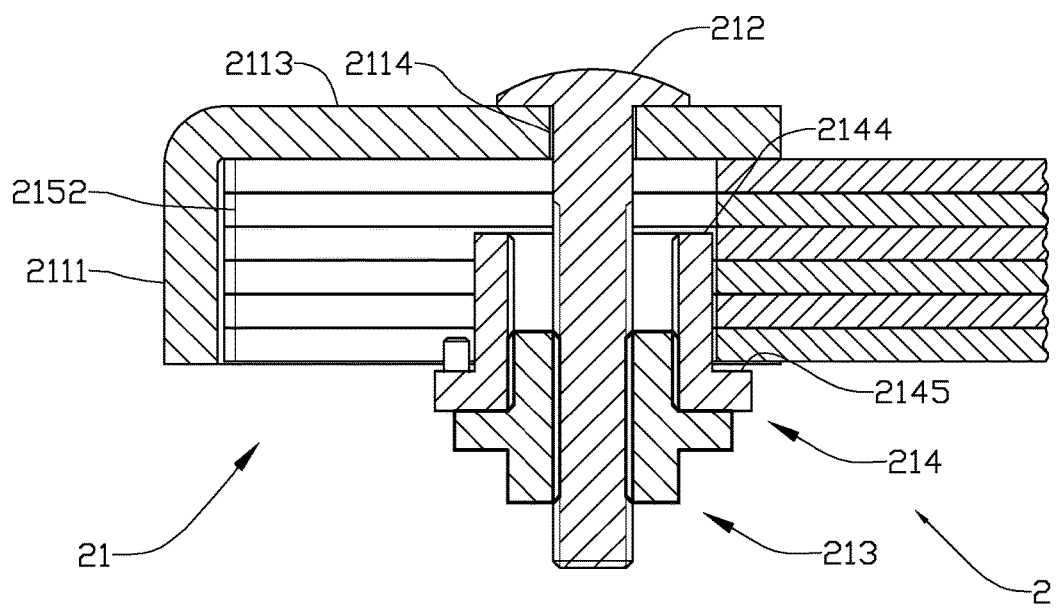
FIG. 9 shows a longitudinal section through an end portion of a leaf-spring compound after several springs have been fitted.

A sleeve-shaped supporting element 214 includes a projecting end portion 2142 with a diameter $D_3$ (see FIG. 6 in particular). Opposite the projecting end portion 2141, an end portion forms a first abutment surface 2144 arranged to abut against the coupling element 211. The projecting end portion 2141 forms a second abutment surface 2145, which is arranged to abut against the end portion 2153 of the inner leaf spring 215' of the leaf-spring compound 2. Internally, the supporting element 214 is provided with a threaded portion 2143. The cylindrical portion has a diameter $D_1$ which is smaller than the transverse dimension W of the leaf-spring cut-outs 2152. From the abutment surface 2145 of the projecting end portion 2141, a securing means 2142 in the form of a peg arranged to engage with the cut-out 2152 projects in the axial direction.

A stop means 213 in the form of a nut (see FIG. 7 in particular) is provided with an internal threaded portion 2137 arranged to engage with the clamping bolt 212. The nut 213 is also provided with an external threaded portion 2136 arranged to engage with the sleeve-shaped supporting element 214. The nut 213 also includes a projecting portion 2133 with a diameter $D_2$, which is larger than the diameter of the threaded portion 2143 of the supporting element 214 and forms an abutment surface 2134 that may abut against the projecting end portion 2141 of the supporting element 214. In an end portion 2135' distant from the external threaded portion 2136, the nut 213 includes a coupling portion 2135 arranged to receive a tightening tool (not shown), for example an open-end spanner.

The external threaded portion 2136 has a larger thread pitch than the internal threaded portion 2137. This gives the effect, when the nut 213 is being screwed in, of the supporting element 214 being lifted a little so that a certain clearance forms between the second abutment surface 2145 of the supporting element 2145 and the inner leaf spring 215' of the leaf-spring compound 2. Thereby the leaf springs 215, 215' can move relative to each other when the leaf-spring compound 2 is being tensioned in connection with the release system 1 being activated and the leaf springs 215, 215' being curved with different diameters.

The invention claimed is:

1. An attachment arrangement comprising:
   a coupling element configured to support end portions of a plurality of leaf springs of a leaf spring compound used in a release system for soil working implements;
   a clamping bolt configured to attach the end portions of the plurality of leaf springs to the coupling element;
   a stop element; and
   a supporting element configured to create a clearance to an inner leaf spring,
   wherein the supporting element is positioned at least partially over a cut-out provided in the plurality of leaf springs, and
   wherein the stop element is a locking bolt configured to engage with one or more locking-bolt holes provided in the clamping bolt.

2. The attachment arrangement according to claim 1, wherein the supporting element is a supporting plate that is complementary to an inside of the coupling element.

3. An attachment arrangement comprising:
   a coupling element configured to support end portions of a plurality of leaf springs of a leaf spring compound used in a release system for soil working implements;
   a clamping bolt configured to attach the end portions of the plurality of leaf springs to the coupling element;
   a stop element; and
   a supporting element configured to create a clearance to an inner leaf spring, wherein
   the supporting element is positioned at least partially over a cut-out provided in the plurality of leaf springs,
   the stop element is a nut, and a width of the cut-out is larger than a diameter of the supporting element, but smaller than a diameter of a projecting outer end portion of the supporting element, and the supporting element includes an internal threaded portion,
   the nut includes a projecting portion, an external threaded portion configured to engage with the internal threaded portion of the supporting element, an internal threaded portion and a coupling portion configured to engage with a tightening tool,
   the clamping bolt includes an engagement portion configured to releasably engage with the internal threaded portion of the nut, and
   the external threaded portion of the nut has a larger thread pitch than the internal threaded portion of the nut.

4. The attachment arrangement according to claim 3, wherein the coupling portion comprises the projecting portion of the nut.

5. The attachment arrangement according to claim 3, wherein the coupling portion comprises a second end portion of the nut.

6. The attachment arrangement according to claim 1, wherein the supporting element includes a securing device.

7. The attachment arrangement according to claim 6, wherein the securing device is a peg arranged in a projecting outer end portion of the supporting element and configured to engage with a portion of the cut-out, and wherein the cut-out includes a mouth in the end portions of the plurality of leaf springs.

8. The attachment arrangement according to claim 6, wherein the securing device is a spring pin arranged in a securing-device hole in the stop element.

9. The attachment arrangement according to claim 3, wherein the supporting element is a supporting plate that is complementary to an inside of the coupling element.

10. The attachment arrangement according to claim 3, wherein the supporting element includes a securing device.

11. The attachment arrangement according to claim 10, wherein the securing device is a peg arranged in a projecting outer end portion of the supporting element and configured to engage with a portion of the cut-out, and wherein the cut-out includes a mouth in the end portions of the plurality of leaf springs.

12. The attachment arrangement according to claim 10, wherein the securing device is a spring pin arranged in a securing-device hole in the stop element.

13. An attachment arrangement comprising:
    a coupling element configured to support end portions of a plurality of leaf springs of a leaf-spring compound used in a release system for soil-working implements;
    a clamping bolt configured to attach the end portions of the plurality of leaf springs to the coupling element;
    a stop element; and
    a supporting element configured to create a clearance to an inner leaf spring, wherein
    the supporting element is positioned at least partially over a cut-out provided in the plurality of leaf springs,
    the supporting element includes a securing device, and
    the securing device is a peg arranged in a projecting outer end portion of the supporting element and configured to engage with a portion of the cut-out, and wherein the cut-out includes a mouth in the end portions of the plurality of leaf springs.

14. The attachment arrangement according to claim 13, wherein the stop element is a locking bolt configured to engage with one or more locking-bolt holes provided in the clamping bolt.

15. The attachment arrangement according to claim 13, wherein the supporting element is a supporting plate that is complementary to an inside of the coupling element.

16. The attachment arrangement according to claim 13, wherein
the stop element is a nut, and a width of the cut-out is larger than a diameter of the supporting element, but smaller than a diameter of a projecting outer end portion of the supporting element, and the supporting element includes an internal threaded portion,
the nut includes a projecting portion, an external threaded portion configured to engage with the internal threaded portion of the supporting element, an internal threaded portion and a coupling portion configured to engage with a tightening tool,
the clamping bolt includes an engagement portion configured to releasably engage with the internal threaded portion of the nut, and
the external threaded portion of the nut has a larger thread pitch than the internal threaded portion of the nut.

17. The attachment arrangement according to claim 16, wherein the coupling portion comprises the projecting portion of the nut.

18. The attachment arrangement according to claim 16, wherein the coupling portion comprises a second end portion of the nut.

19. An attachment arrangement comprising:
a coupling element configured to support end portions of a plurality of leaf springs of a leaf-spring compound used in a release system for soil-working implements;
a clamping bolt configured to attach the end portions of the plurality of leaf springs to the coupling element;
a stop element; and
a supporting element configured to create a clearance to an inner leaf spring, wherein
the supporting element is positioned at least partially over a cut-out provided in the plurality of leaf springs,
the supporting element includes a securing device, and
the securing device is a spring pin arranged in a securing-device hole in the stop element.

* * * * *